(12) United States Patent
Konno et al.

(10) Patent No.: US 8,979,374 B2
(45) Date of Patent: Mar. 17, 2015

(54) ROTATING DEVICE

(71) Applicant: Alphana Technology Co., Ltd., Shizuoka (JP)

(72) Inventors: Katsushige Konno, Shizuoka (JP); Kazuyoshi Nagai, Shizuoka (JP); Hiromitsu Goto, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 13/764,033

(22) Filed: Feb. 11, 2013

(65) Prior Publication Data
US 2013/0216168 A1    Aug. 22, 2013

(30) Foreign Application Priority Data
Feb. 21, 2012   (JP) .................................. 2012-035450

(51) Int. Cl.
*F16C 32/06* (2006.01)
*F16C 33/74* (2006.01)
*F16C 17/10* (2006.01)
*F16C 33/10* (2006.01)

(52) U.S. Cl.
CPC ........... *F16C 32/0629* (2013.01); *F16C 33/745* (2013.01); *F16C 17/107* (2013.01); *F16C 33/107* (2013.01); *F16C 33/1085* (2013.01); *F16C 2240/60* (2013.01); *F16C 2370/12* (2013.01)

USPC ........................................... 384/107; 384/119

(58) Field of Classification Search
USPC ......................................... 384/100, 107, 119
See application file for complete search history.

(56) References Cited

U.S. PATENT DOCUMENTS

| | | | |
|---|---|---|---|
| 4,613,288 A * | 9/1986 | McInerney | 384/107 |
| 5,223,758 A * | 6/1993 | Kataoka et al. | 310/90 |
| 5,423,612 A * | 6/1995 | Zang et al. | 384/119 |
| 6,154,339 A * | 11/2000 | Grantz et al. | 360/99.08 |
| 7,284,909 B2 * | 10/2007 | Aiello et al. | 384/112 |
| 8,408,798 B2 * | 4/2013 | Kim et al. | 384/107 |
| 8,591,113 B2 * | 11/2013 | Satoji et al. | 384/100 |
| 8,618,706 B2 * | 12/2013 | Grantz et al. | 310/90 |

FOREIGN PATENT DOCUMENTS

JP    2011163502 A    8/2011

* cited by examiner

*Primary Examiner* — Thomas R. Hannon
(74) *Attorney, Agent, or Firm* — Blank Rome LLP

(57) ABSTRACT

A rotating device comprises a hub, a shaft, and a bearing unit. The bearing unit includes a surrounding portion arranged to surround the shaft, and a facing portion arranged to face an end of the shaft. A gap between the shaft and the surrounding portion includes two dynamic pressure generation portions and an intermediate portion arranged between the two dynamic pressure generation portions. The bearing unit further includes a path of a lubricant arranged to connect one side of one dynamic pressure generation portion and the intermediate portion. The shaft and the bearing unit are arranged so that the lubricant pushed out of the other dynamic pressure generation portion towards a gap between the end of the shaft and the facing portion stays in the gap.

20 Claims, 9 Drawing Sheets

46

246

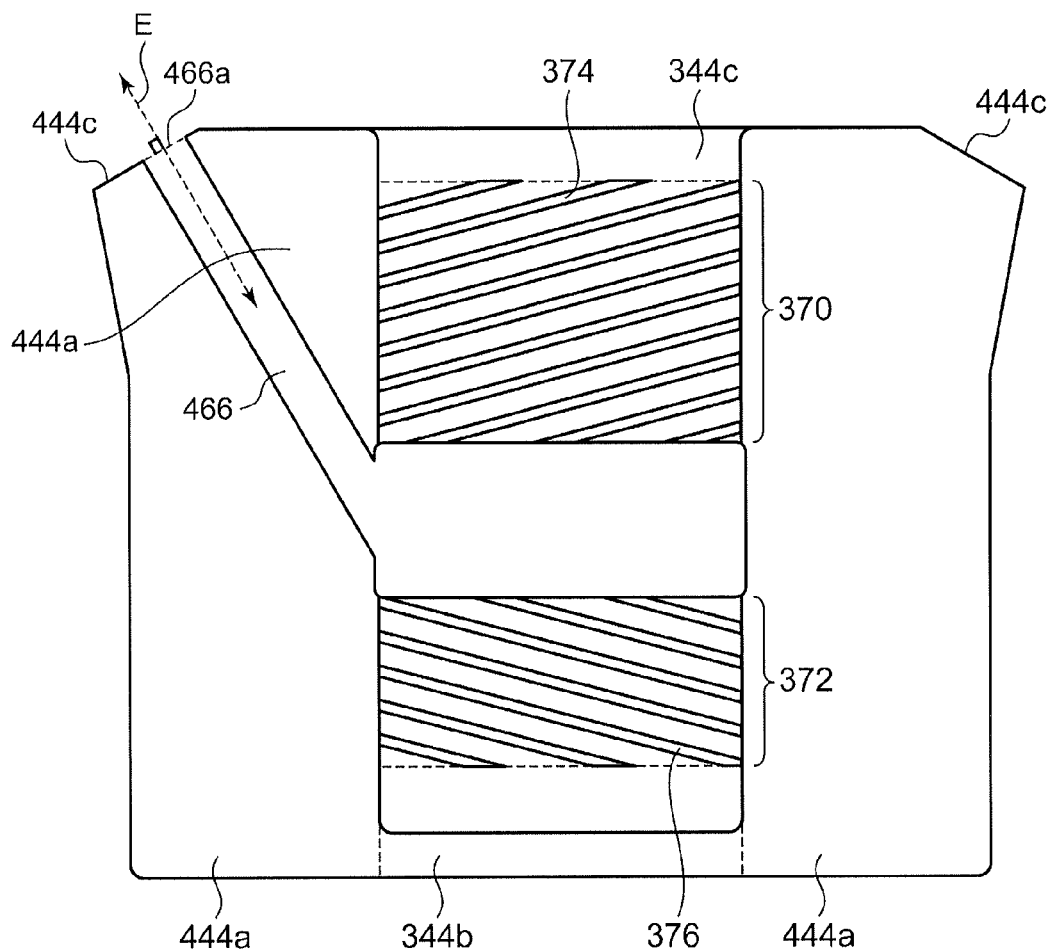

ROTATING DEVICE

BACKGROUND OF THE INVENTION

1. Field of the Invention

The present invention relates to a rotating device and in particular a rotating device comprising a bearing unit arranged to rotatably support a shaft via a lubricant.

2. Description of the Related Art

Disk drive devices, such as hard disk drives, have become miniaturized. The capacity of a disk drive device has also been increased. Such disk drive devices have been installed in various types of electronic devices. In particular, such disk drive devices have been installed in portable electronic devices such as laptop computers or portable music players.

A fluid dynamic bearing is a known bearing for the disk drive device. In a fluid dynamic bearing, a lubricant is injected into a gap between a rotor and a stator, and the fluid dynamic bearing maintains a state in which the rotor does not touch the stator by dynamic pressure created in the lubricant when the rotor rotates with respect to the stator (for example, reference should be made to Japanese Patent Application Publication No. 2011-163502).

SUMMARY OF THE INVENTION

One of the methods for enlarging the recording capacity of a disk drive device is to narrow the width of a recording track and to position a magnetic head close to the surface of a magnetic recording disk. Narrowing the gap between the magnetic head and the surface of the magnetic recording disk may, however, enhance any adverse effects caused to the read/write properties of the disk drive device due to extraneous substances adhering to the surface of the magnetic recording disk.

On the other hand, in a disk drive device adopting a fluid dynamic bearing, the amount of evaporated lubricant increases with time and the likelihood of adhesion of the evaporated lubricant onto the magnetic recording disk may increase accordingly. Considerable reduction of the amount of the lubricant may deteriorate the properties of the fluid dynamic bearing.

Such disadvantages may occur not only in the disk drive device but also in other types of rotating devices that adopt fluid dynamic bearings.

The present invention addresses at least the above disadvantages, and a general purpose of one embodiment of the present invention is to provide a rotating device that can suppress the amount of the evaporated lubricant in the fluid dynamic bearing.

An embodiment of the present invention relates to a rotating device. This rotating device comprises a hub on which a recording disk is to be mounted; a shaft, with a first end affixed to the hub; and a bearing unit arranged to rotatably support the shaft via a lubricant. The bearing unit includes: a surrounding portion arranged to surround the shaft; and a facing portion arranged to face a second end of the shaft. A gap between the shaft and the surrounding portion includes: a first dynamic pressure generation portion in which a first dynamic pressure is generated when the shaft rotates in a predetermined direction, the first dynamic pressure pushing the lubricant towards the first end of the shaft; a second dynamic pressure generation portion in which a second dynamic pressure is generated when the shaft rotates in the predetermined direction, the second dynamic pressure pushing the lubricant towards the second end of the shaft, and the second dynamic pressure generation portion being arranged axially between the second end of the shaft and the first dynamic pressure generation portion, and the second dynamic pressure generation portion being arranged separate from the first dynamic pressure generation portion; and an intermediate portion arranged between the first dynamic pressure generation portion and the second dynamic pressure generation portion. In the case where a side of the first dynamic pressure generation portion closer to the first end of the shaft is called a first side, the bearing unit further includes a path of the lubricant arranged to connect the first side of the first dynamic pressure generation portion and the intermediate portion, the path being different from the first dynamic pressure generation portion. The shaft and the bearing unit are arranged so that the lubricant pushed out of the second dynamic pressure generation portion towards a gap between the second end of the shaft and the facing portion stays in the gap between the second end of the shaft and the facing portion.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which:

FIG. 9 is a section view of a bearing unit according to a third modification example.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

A rotating device according to an embodiment of the present invention is preferably used as a disk drive device, such as a hard disk drive having a magnetic recording disk. This rotating device is provided with two radial dynamic pressure generation portions separated from each other along the shaft. A radial dynamic pressure generation portion existing towards the base of the disk drive device (herein referred to as the base side) is arranged to generate a dynamic pressure that pushes the lubricant towards the base when the rotor of the rotating device rotates. There is an existing region in which the lubricant exists. The existing region is provided closer to the base than the radial dynamic pressure generation portion on the base side. The existing region is arranged in a dead-end like structure (i.e. there is no access port for the lubricant except for the radial dynamic pressure generation portion on the base side). Therefore, the pressure of the lubricant in the existing region increases when the rotor of the rotating device rotates.

As a result, compared with the case where radial dynamic pressure for supporting the shaft in a radial direction (i.e., a direction perpendicular to the rotational axis) is generated at each radial dynamic pressure generation portion, the distance, in an axial direction (i.e., a direction along the rotational axis), between the two positions at which the radial dynamic pressure is generated may be increased. The distance can be referred to as a radial span. This will contribute to improvements of radial stiffness. In addition, it is not necessary to circulate the lubricant in a region closer to the base than the radial dynamic pressure generation portion on the base side. Therefore, it is not necessary to provide a path for circulation, thereby reducing the total amount of required lubricant.

The First Embodiment

Figure 1A:
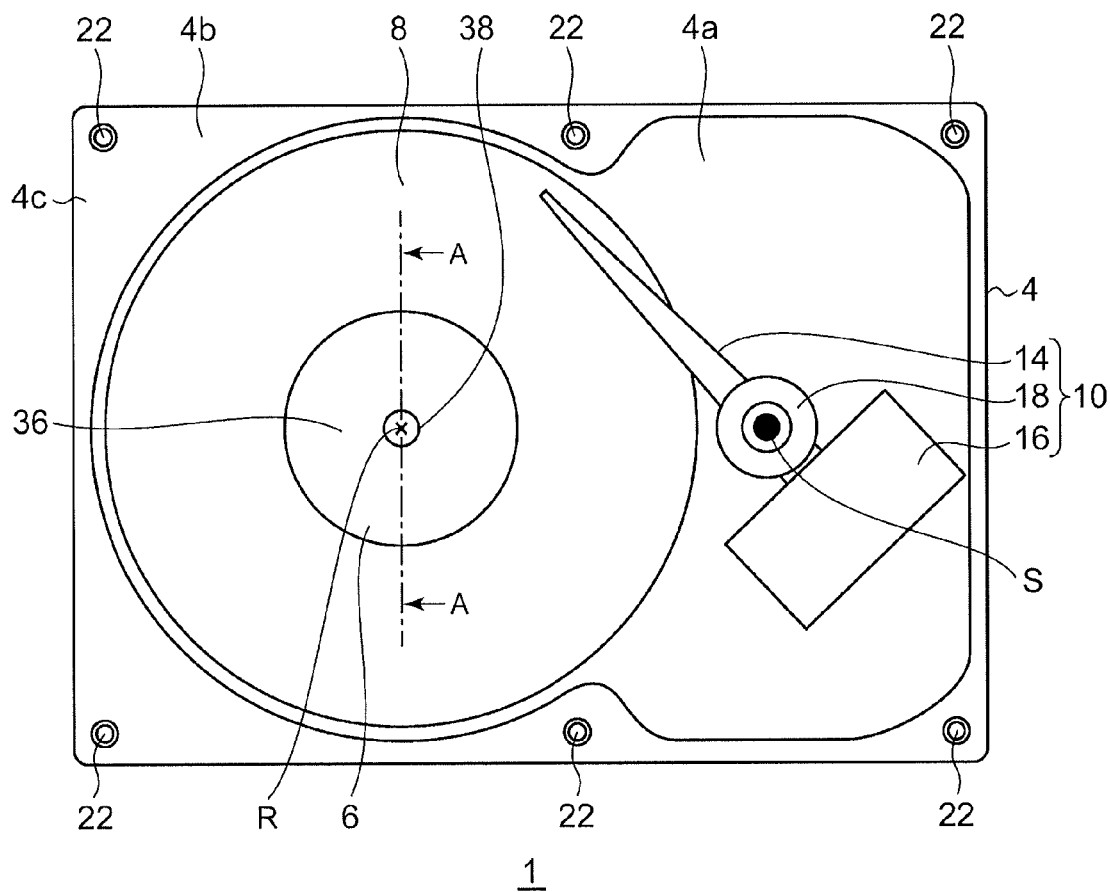
FIG. 1A and FIG. 1B are a top view and a side view, respectively, of a rotating device according to a first embodiment.
Figure 1B:
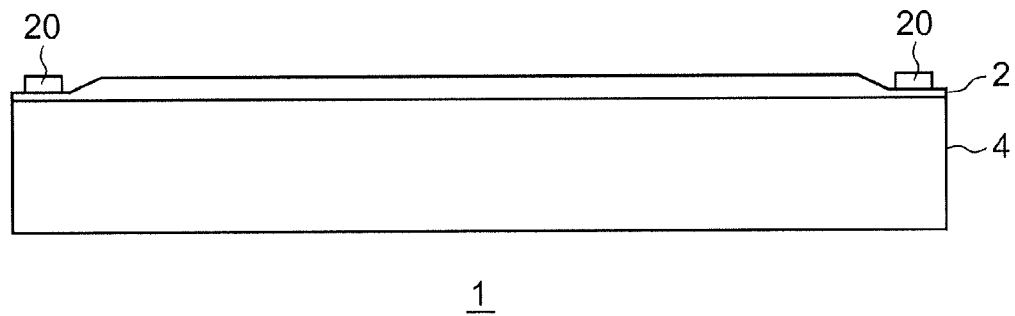

FIG. 1A and FIG. 1B are a top view and a side view, respectively, of the rotating device 1 according to the first embodiment. FIG. 1A is the top view of the rotating device 1. In FIG. 1A, the rotating device 1 is shown without a top cover 2 in order to show the inside of the rotating device 1. The rotating device 1 comprises: a base 4; a rotor 6; a magnetic recording disk 8; a data read/write unit 10; and the top cover 2.

Hereinafter, it is assumed that the side of the base 4 on which the rotor 6 is installed is the "upper" side.

The magnetic recording disk 8 is a 3.5-inch type glass magnetic recording disk, the diameter of which being 95 mm. The diameter of the central hole of the magnetic recording disk 8 is 25 mm, and the thickness of the disk 8 is 1.27 mm. The magnetic recording disk 8 is mounted on the rotor 6 and rotates therewith. The rotor 6 is rotatably mounted to the base 4 through the bearing unit 12, which is not shown in FIG. 1A.

The rotor 6 includes a clamper 36 and a screw 38 for affixing a disk. The clamper 36 is pressed against the upper surface of the hub 28 (not shown in FIGS. 1A, 1B) by the screw 38 for affixing a disk. The clamper 36 presses the magnetic recording disk 8 against the disk-mount surface of the hub 28.

The base 4 includes: a bottom plate 4a forming the bottom portion of the rotating device 1; and an outer circumference wall 4b formed along the outer circumference of the bottom plate 4a so that the outer circumference wall 4b surrounds an installation region of the magnetic recording disk 8. Six screw holes 22 are formed on the upper surface 4c of the outer circumference wall 4b.

The data read/write unit 10 includes: a read/write head (not shown); a swing arm 14; a voice coil motor 16; and a pivot assembly 18. The read/write head is attached to the tip of the swing arm 14. The read/write head records data onto and reads out data from the magnetic recording disk 8. The pivot assembly 18 swingably supports the swing arm 14 with respect to the base 4 around the head rotation axis S. The voice coil motor 16 swings the swing arm 14 around the head rotation axis S and moves the read/write head to the desired position on the upper surface of the magnetic recording disk 8. The voice coil motor 16 and the pivot assembly 18 are constructed using a known technique for controlling the position of the head.

FIG. 1B is the side view of the rotating device 1. The top cover 2 is fixed onto the upper surface 4c of the outer circumference wall 4b of the base 4 using six screws 20. The six screws 20 correspond to the six screw holes 22, respectively. In particular, the top cover 2 and the upper surface 4c of the outer circumference wall 4b are fixed together so that a joint portion between both does not create a leak into the inside of the rotating device 1.

Figure 2:
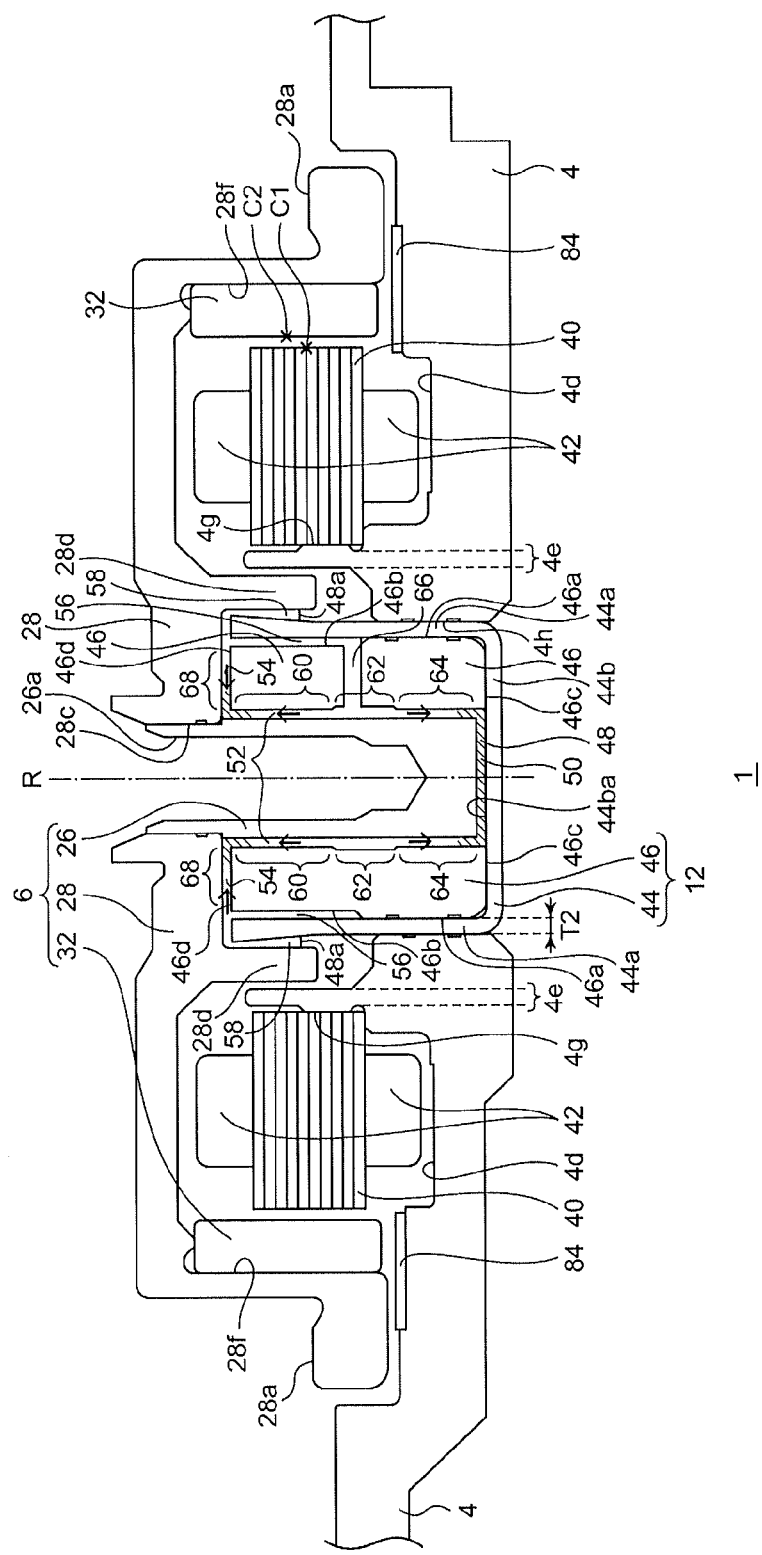
FIG. 2 is a section view sectioned along line A-A in FIG. 1A.

FIG. 2 is a view that is sectioned along the line A-A, as illustrated in FIG. 1A. In FIG. 2, the magnetic recording disk 8, the clamper 36 and the screw 38 for affixing a disk are omitted from display. The rotor 6 further includes the shaft 26, the hub 28, and a cylindrical magnet 32.

The magnetic recording disk 8 is mounted on a disk-mount surface 28a of the hub 28. The hub 28 is made of soft-magnetic steel such as SUS430F. The hub 28 is formed to be predetermined cup-like shape by, for example, the press working or cutting of a steel plate. For example, the hub 28 may preferably be made of the stainless steel (DHS1) provided by Daido Steel Co., Ltd. since the stainless steel has lower outgas and is easily-worked. The hub 28 may more preferably be made of the stainless steel (DHS2) provided by Daido Steel Co., Ltd. since the stainless steel has high corrosion resistance.

A screw hole 26a for affixing a disk is provided on an upper end surface of the shaft 26. The screw 38 for affixing a disk is to be screwed into the screw hole 26a. The upper end of the shaft 26 is fixed in the hole 28c arranged at the center of the hub 28 by using both press-fitting and glue, the hole 28c being arranged coaxially with the rotational axis R of the rotor 6.

The cylindrical magnet 32 is glued onto a cylindrical inner surface 28f, which is an inner cylindrical surface of the hub 28. The cylindrical magnet 32 is made of a rare-earth material such as Neodymium, Iron, or Boron. The cylindrical magnet 32 faces radially towards twelve teeth of the laminated core 40. The cylindrical magnet 32 is magnetized for driving, with sixteen poles along a circumferential direction (i.e., in a tangential direction of a circle, the center of which being the rotational axis R, the circle being perpendicular to the rotational axis R). The surface of the cylindrical magnet 32 is treated with electro deposition coating or spray coating to prevent rusting.

The base 4, a laminated core 40, coils 42, a magnetic ring 84, and a bearing unit 12 form the stator of the rotating device 1. The laminated core 40 has a ring portion and twelve teeth, which extend radially outward from the ring portion, and is fixed on the upper surface 4d side of the base 4. The laminated core 40 is formed by laminating ten thin magnetic steel sheets and mechanically integrating them. An insulation coating is applied onto the surface of the laminated core 40 by electrodeposition coating or powder coating. Each of the coils 42 is wound around one of the twelve teeth, respectively. A flux is generated along the teeth by applying a three-phase sinusoidal driving current through the coils 42. A ring-shaped wall 4e, the center of which being along the rotational axis R of the rotor 6, is formed on the upper surface 4d of the base 4. The laminated core 40 is fitted to the outer surface 4g of the ring-shaped wall 4e with a press-fit or clearance fit and glued thereon.

The laminated core 40 is fixed so that the axial center C1 of the laminated core 40 is closer to the base 4 than the axial center C2 of the inner surface of the cylindrical magnet 32. Through this, a first magnetic suction force is applied to the cylindrical magnet 32, the force attracting the cylindrical magnet 32 towards the base 4.

The magnetic ring 84 is arranged on a part of the upper surface 4d of the base 4 that axially faces the cylindrical magnet 32. The magnetic ring 84 is formed as an axially-thin ring and is made of soft-magnetic material such as a steel plate. The magnetic ring 84 is fixed (for example, glued) onto the upper surface 4d of the base 4 with its inner surface being coaxial with the rotational axis R. The magnetic ring 84 may be fixed to the base 4 by mechanically attaching the side surface of the magnetic ring 84 to the base 4. For example, the inner portion of the magnetic ring 84 may be closer to the rotational axis R than the inner portion of the cylindrical magnet 32. The outer portion of the magnetic ring 84 may be farther than the outer portion of the cylindrical magnet 32 from the rotational axis R. By providing the magnetic ring 84, a second magnetic suction force is applied to the cylindrical magnet 32, the force attracting the cylindrical magnet 32 towards the magnetic ring 84 (i.e., the base 4). As a result, the axial position of the hub 28 is stabilized at a position of equilibration between the first magnetic suction force, the second magnetic suction force, and the after-mentioned levitation force of the hub 28 (due to thrust dynamic pressure). It should be noted that, in the case where the levitation force of the hub 28 is relatively small, at least one of the first and the second magnetic suction forces may be removed.

A through hole 4h, the center of which being along the rotational axis R of the rotor 6, is formed on the base 4. The bearing unit 12 is inserted into the through hole 4h and fixed therein. The bearing unit 12 includes the housing 44 and the sleeve 46 and rotatably supports the rotor 6 with respect to the base 4 via the lubricant 48. The housing 44 is formed separately from the sleeve 46.

The housing 44 is glued in the through hole 4h of the base 4. The housing 44 is formed to be cup-shaped by integrating a cylindrical portion 44a and a bottom portion 44b as a single unit. The housing 44 is glued to the base 4 with the bottom portion 44b downside. The cylindrical portion 44a surrounds the sleeve 46. The bottom portion 44b faces, in the axial direction, the lower end of the shaft 26, a disk-shaped lower gap 50 being interposed between the bottom portion 44b and the lower end of the shaft 26.

The sleeve 46 is a cylindrical member that is fixed on the inner side of the housing 44. The sleeve 46 has a lower outer surface 46a glued to the inner surface of the cylindrical portion 44a, an upper outer surface 46b having a diameter less than the diameter of the lower outer surface 46a, and a lower-end surface 46c touching the upper surface 44ba of the bottom portion 44b. The upper outer surface 46b faces, in the radial direction, the inner surface of the cylindrical portion 44a, a cylindrical outer gap 56 being interposed between the upper outer surface 46b and the inner surface of the cylindrical portion 44a. In other words, the sleeve 46 and the cylindrical portion 44a form the outer gap 56 or the ring-shaped concave portion extending downwards from the upper-end surface 46d of the sleeve 46. A connection hole 66 connecting the after-mentioned intermediate portion 62 and the outer gap 56 is formed in the sleeve 46.

The sleeve 46 surrounds and accommodates the shaft 26. A cylindrical radial bearing gap 52 is interposed between the sleeve 46 and the shaft 26. Both the upper end of the cylindrical portion 44a and the upper end of the sleeve 46 faces, in the axial direction, the hub 28, a ring-shaped upper gap 54 being interposed between each upper end and the hub 28. A part of the cylindrical portion 44a that radially faces the hanging portion 28d of the hub 28 is arranged so that the closer to the upper end a position in the part is, the larger the outer circumference of the part at the position will be. The bearing unit 12 is arranged so that the maximum radial thickness or the wall thickness T2 of a part of the cylindrical portion 44a that is glued to the lower outer surface 46a is in the range of one-third to one-fifteenth of the maximum radial thickness or the wall thickness T1 (shown in FIG. 3) of the lower outer surface 46a of the sleeve 46. In this case, the cylindrical portion 44a is relatively thin. Therefore, required dimensional accuracy of the housing 44 can be suppressed and the housing 44 becomes easier to manufacture. It is more preferable that T2 is in the range of one-fifth to one-tenth of T1. By having an arrangement in which the wall thickness T2 of the cylindrical portion 44a of the housing 44 is less than the wall thickness T1 of the sleeve 46, deformations of the sleeve 46 occurring when fixing the sleeve 46 to the housing 44 can be suppressed, and, in particular, the reduction of dimensional accuracy of the inner surface of the sleeve 46 can be suppressed.

The lubricant 48 is injected into the upper gap 54, the outer gap 56, the radial bearing gap 52, and the lower gap 50. In particular, the lubricant 48 continually exists in these gaps. A gas-liquid interface 48a of the lubricant 48 exists in an interface gap 58. The interface gap 58 is a gap between the inner surface of the hanging portion 28d of the hub 28 and the outer surface of the cylindrical portion 44a, the hanging portion 28d surrounding the upper side of the bearing unit 12. In particular, the interface gap 58 forms a capillary seal, where the gap 58 gradually widens downward. The capillary seal functions as a reservoir for the lubricant 48 to absorb any change in volume, while the capillary seal prevents the leakage of the lubricant 48 by way of the capillary effect.

The radial bearing gap 52 has an upper radial dynamic pressure generation portion 60, a lower radial dynamic pressure generation portion 64 arranged below and spaced apart from the upper radial dynamic pressure generation portion 60, and an intermediate portion 62 arranged between the upper radial dynamic pressure generation portion 60 and the lower radial dynamic pressure generation portion 64 in the axial direction. When the rotor 6 rotates in a predetermined normal rotation direction (this case hereinafter is referred to as "when the rotor 6 rotates"), a dynamic pressure for pushing the lubricant 48 upward is generated in the lubricant 48 existing in the upper radial dynamic pressure generation portion 60. When the rotor 6 rotates, a dynamic pressure for pushing the lubricant 48 downward is generated in the lubricant 48 existing in the lower radial dynamic pressure generation portion 64.

The upper gap 54 has a thrust dynamic pressure generation portion 68. When the rotor 6 rotates, a dynamic pressure for pushing the lubricant 48 inward (i.e., towards the shaft 26) is generated in the lubricant 48 existing in the thrust dynamic pressure generation portion 68.

The connection hole 66 and the outer gap 56 form a bypass path for the lubricant 48 connecting the upper side of the upper radial dynamic pressure generation portion 60 or the upper gap 54 and the intermediate portion 62. In particular, the bypass path connects one side of the thrust dynamic pressure generation portion 68 and the intermediate portion 62. The one side of the thrust dynamic pressure generation portion 68 is farther than another side from the shaft 26 and can be regarded as an outer side of the thrust dynamic pressure generation portion 68.

The shaft 26 and the bearing unit 12 are arranged so that the lubricant 48 pushed out of the lower radial dynamic pressure generation portion 64 towards the lower gap 50 stays in the lower gap 50 when the rotor 6 rotates. The lower gap 50 is in fluid communication with the lower radial dynamic pressure generation portion 64. However, the lower gap 50 does not have any access port for the lubricant 48 except for the boundary to the lower radial dynamic pressure generation portion 64. In other words, the shaft 26 and the bearing unit 12 are arranged so that the downside of the lower radial dynamic pressure generation portion 64 is dead-ended and that there is no way for the lubricant 48 to escape.

When the rotor 6 rotates, the lubricant 48 moves from the intermediate portion 62 into the lower gap 50 due to the downward dynamic pressure generated in the lower radial dynamic pressure generation portion 64. As a result, pressure in the lubricant 48 existing in the lower part of the lower radial dynamic pressure generation portion 64 and in the lower gap 50 increases. In addition, the lubricant 48 moves from the intermediate portion 62 into the upper part of the upper radial dynamic pressure generation portion 60 due to the upward dynamic pressure generated in the upper radial dynamic pressure generation portion 60. Due to the inward dynamic pressure generated in the thrust dynamic pressure generation portion 68, the lubricant 48 moves from both the outer gap 56 and the interface gap 58 into a part of the thrust dynamic pressure generation portion 68 that is closer to the shaft 26. As a result, pressure in the lubricant 48 existing in the upper part of the upper radial dynamic pressure generation portion 60 and in the part of the thrust dynamic pressure generation portion 68 that is closer to the shaft 26 increases. In FIG. 2, the parts in which the pressure in the lubricant 48 increases are schematically shown as regions hatched with oblique lines.

These local increases of the pressure in the lubricant 48 makes it possible for the rotor 6 to be supported in the radial and axial directions without direct contact with respect to the stator.

Figure 3:
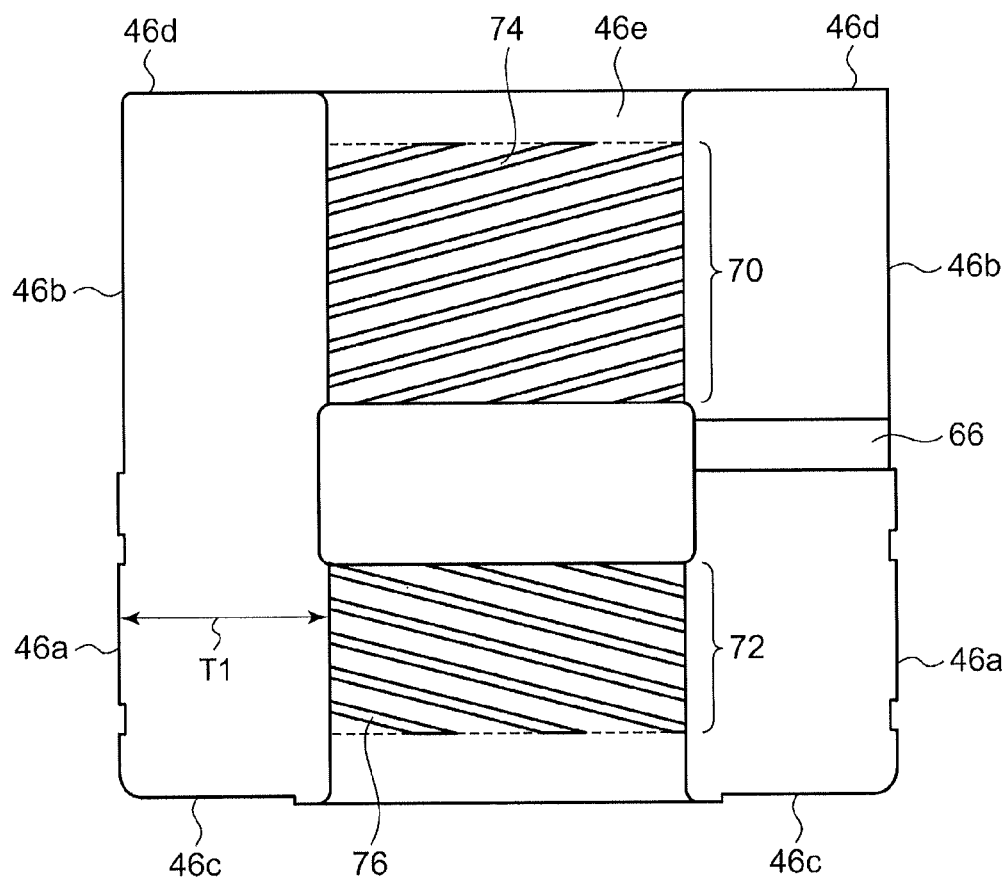
FIG. 3 is a section view of the sleeve in FIG. 2.

FIG. 3 is a section view of the sleeve 46 in FIG. 2. The section shown in FIG. 3 corresponds to the section shown in FIG. 2. The inner surface 46e of the sleeve 46 has an upper radial dynamic pressure groove forming region 70 and a lower radial dynamic pressure groove forming region 72, the two regions being spaced apart from each other in the axial direction. Spiral-shaped upper radial dynamic pressure grooves 74 are formed on the upper radial dynamic pressure groove forming region 70. Spiral-shaped lower radial dynamic pressure grooves 76 are formed on the lower radial dynamic pressure groove forming region 72. The upper radial dynamic pressure grooves 74 incline in a specified direction with respect to the rotational axis R. The lower radial dynamic pressure grooves 76 also incline in a direction opposite to the specified direction with respect to the rotational axis R. In particular, the specified direction crosses the direction opposite to the specified direction, and the angle formed by the specified direction and the rotational axis R is approximately equal to the angle formed by the direction opposite to the specified direction and the rotational axis R. In particular, the upper radial dynamic pressure grooves 74 incline so that, when the rotor 6 rotates, the grooves push the lubricant 48, which is rotating due to rotation of the shaft 26, upward. The lower radial dynamic pressure grooves 76 incline so that, when the rotor 6 rotates, the grooves push the rotating lubricant 48 downward. The upper radial dynamic pressure groove forming region 70 is a zonal region surrounding the rotational axis R and is formed so that the region is approximately parallel to the rotational axis R. The lower radial dynamic pressure groove forming region 72 is arranged in a similar manner.

It should be noted that the upper radial dynamic pressure grooves 74 may be formed, instead of or in addition to, on the upper radial dynamic pressure groove forming region 70, on a part of the outer surface of the shaft 26 that faces the upper radial dynamic pressure groove forming region 70, the upper radial dynamic pressure generation portion 60 being interposed between the part and the upper radial dynamic pressure groove forming region 70. It should be noted that the lower radial dynamic pressure grooves 76 may be formed, instead of or in addition to, on the lower radial dynamic pressure groove forming region 72, on a part of the outer surface of the shaft 26 that faces the lower radial dynamic pressure groove forming region 72, the lower radial dynamic pressure generation portion 64 being interposed between the part and the lower radial dynamic pressure groove forming region 72.

Figure 4:
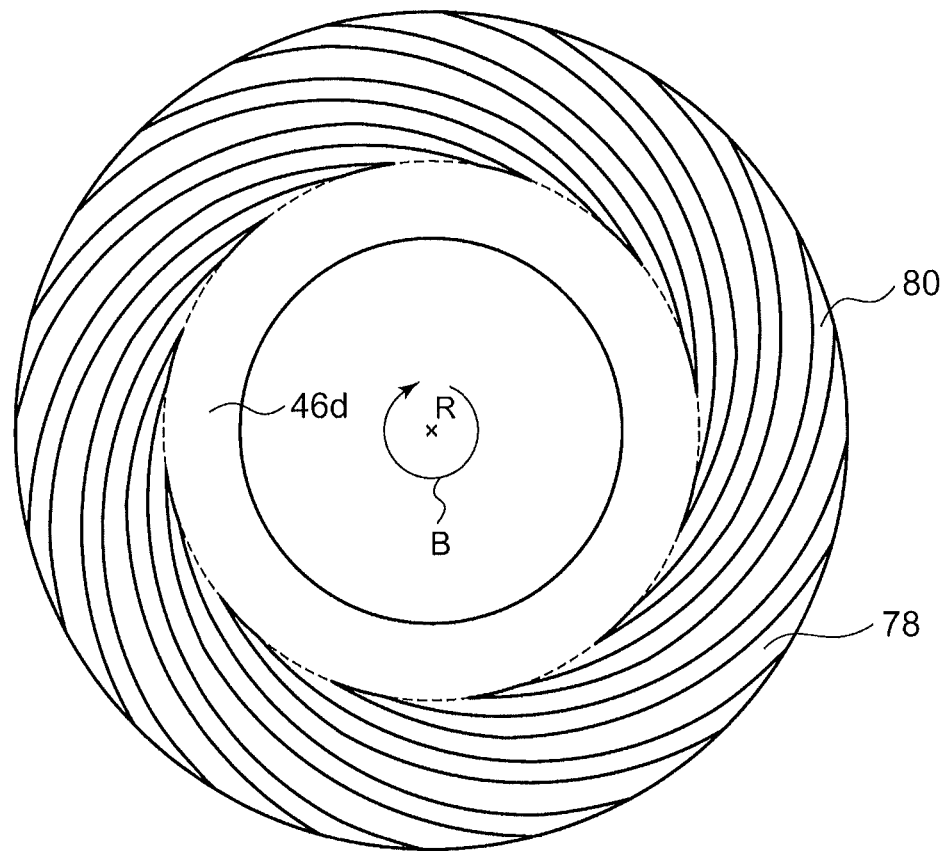
FIG. 4 is a top view of the sleeve in FIG. 2.

FIG. 4 is a top view of the sleeve 46 in FIG. 2. The upper-end surface 46d of the sleeve 46 has a thrust dynamic pressure groove forming region 78. Spiral-shaped thrust dynamic pressure grooves 80 are formed on the thrust dynamic pressure groove forming region 78. The thrust dynamic pressure grooves 80 are formed so that, when the rotor 6 rotates in the normal, rotation direction B (clockwise in FIG. 4), the grooves push the rotating lubricant 48 towards the rotational axis R. The thrust dynamic pressure groove forming region 78 is a zonal region surrounding the rotational axis R and is formed so that the region is approximately perpendicular to the rotational axis R.

It should be noted that the thrust dynamic pressure grooves 80 may be formed, instead of or in addition to, on the thrust dynamic pressure groove forming region 78, on a part of the lower surface of the hub 28 that faces the thrust dynamic pressure groove forming region 78, the thrust dynamic pressure generation portion 68 being interposed between the part and the thrust dynamic pressure groove forming region 78.

The aforementioned operation of the rotating device 1 shall be described below. A three-phase driving current is supplied to the coils 42 to rotate the magnetic recording disk 8. Flux is generated along the twelve teeth by making the driving current flow through the coils 42. This flux gives torque to the cylindrical magnet 32, and the rotor 6 and the magnetic recording disk 8, which is fitted to the rotor 6, rotate. Along with this, the voice coil motor 16 swings the swing arm 14, and the read/write head goes back and forth within the swing range on the magnetic recording disk 8. The read/write head converts magnetic data recorded on the magnetic recording disk 8 to an electrical signal and transmits the electrical signal to a control board (not shown). The read/write head also converts data sent from the control board in a form of an electrical signal to magnetic data and writes the magnetic data on the magnetic recording disk 8.

In the rotating device 1 according to the present embodiment, when the rotor 6 of the rotating device 1 rotates, pressure in the lubricant 48, for supporting the shaft 26 in the radial direction, is generated both below the lower radial dynamic pressure generation portion 64 and above the upper radial dynamic pressure generation portion 60. Therefore, the radial span can be made greater than the distance between the upper radial dynamic pressure generation portion 60 and the lower radial dynamic pressure generation portion 64. This improves bearing stiffness.

In the rotating device 1 according to the present embodiment, spiral-shaped dynamic pressure grooves are adopted. Therefore, compared with the case where herringbone-shaped grooves are adopted, pumping function is improved thereby increasing pressure for supporting rotation.

In the rotating device 1 according to the present embodiment, the shaft 26 and the bearing unit 12 are arranged so that the lubricant 48 pushed out of the lower radial dynamic pressure generation portion 64 towards the lower gap 50 stays in the lower gap 50 when the rotor 6 rotates. Therefore, compared with the case where a path for the lubricant 48 bypassing the lower radial dynamic pressure generation portion 64 is arranged with one end of the path being at the lower gap 50, it is not necessary to provide such a path and the total amount of the lubricant 48 to be filled can be decreased accordingly.

The reduction of the total amount of the lubricant 48 to be filled causes a reduction of the change of volume of the lubricant 48 due to the change of temperature and a reduction of the change of volume of the gap filled with the lubricant 48. Such volume changes are at least partly absorbed by the reservoir for the lubricant 48 or the capillary seal. Therefore, the capillary seal can be made smaller. In the design process of a capillary seal, a gap width at the narrowest point is determined based on a gap width at other points or by processing accuracy. Then, the capillary seal is designed so that the gap widens at a constant rate from the narrowest point. Therefore, since reduction of the amount of the lubricant existing in the capillary seal causes reduction of the area of the gas-liquid interface 48a, it, is possible to reduce the rate of evaporation of the lubricant 48. As a result, contamination of the magnetic recording disk 8 due to evaporated lubricant 48 is alleviated. Reduction of the amount of the lubricant 48 with time is alleviated, thereby improving reliability or the life of the rotating device 1.

In the rotating device 1 according to the present embodiment, pressure in the lubricant 48 existing in the part above the upper radial dynamic pressure generation portion 60 and in the part of the thrust dynamic pressure generation portion 68 that is closer to the shaft 26 increases when the rotor 6 rotates. The increased pressure supports the rotor 6. Therefore, compared with the case where support is given by the flow of lubricant, more stable support of the rotor 6 can be realized.

In the rotating device 1 according to the present embodiment, the bypass path for the lubricant 48 is divided into a radial portion and an axial portion. As a result, the axial portion of the path can be formed by adjusting the diameter of the sleeve 46 or the cylindrical portion 44a instead of by drilling or making a groove, thereby making the manufacturing process easier.

In the first embodiment, each of the upper radial dynamic pressure grooves 74, the lower radial dynamic pressure grooves 76, and the thrust dynamic pressure grooves 80 is spiral-shaped. However, the present invention is not limited to this.

The upper radial dynamic pressure grooves may create total upward dynamic pressure in the upper radial dynamic pressure generation portion. For example, the upper radial dynamic pressure grooves may have an asymmetric herringbone shape. Alternatively, the upper radial dynamic pressure grooves may create, approximately, in the upper radial dynamic pressure generation portion, radial dynamic pressure for radially supporting the rotor when the rotor rotates. For example, the upper radial dynamic pressure grooves may have a symmetric herringbone shape.

The lower radial dynamic pressure grooves may create total downward dynamic pressure in the lower radial dynamic pressure generation portion. For example, the lower radial dynamic pressure grooves may have an asymmetric herringbone shape.

The thrust dynamic pressure grooves may create total inward dynamic pressure in the thrust dynamic pressure generation portion. For example, the thrust dynamic pressure grooves may have a herringbone shape. Alternatively, the thrust dynamic pressure grooves may create, approximately, in the thrust dynamic pressure generation portion, thrust dynamic pressure for axially supporting the rotor when the rotor rotates. Alternatively, the thrust dynamic pressure grooves may create total outward dynamic pressure in the thrust dynamic pressure generation portion. In this case, the upper side of the shaft 26 is supported by the lubricant 48, circulating in the order of: (the thrust dynamic pressure generation portion 68) to (the outer gap 56) to (the connection hole 66) to (the intermediate portion 62) to (the upper radial dynamic pressure generation portion 60) back to (the thrust dynamic pressure generation portion 68).

Figure 5:
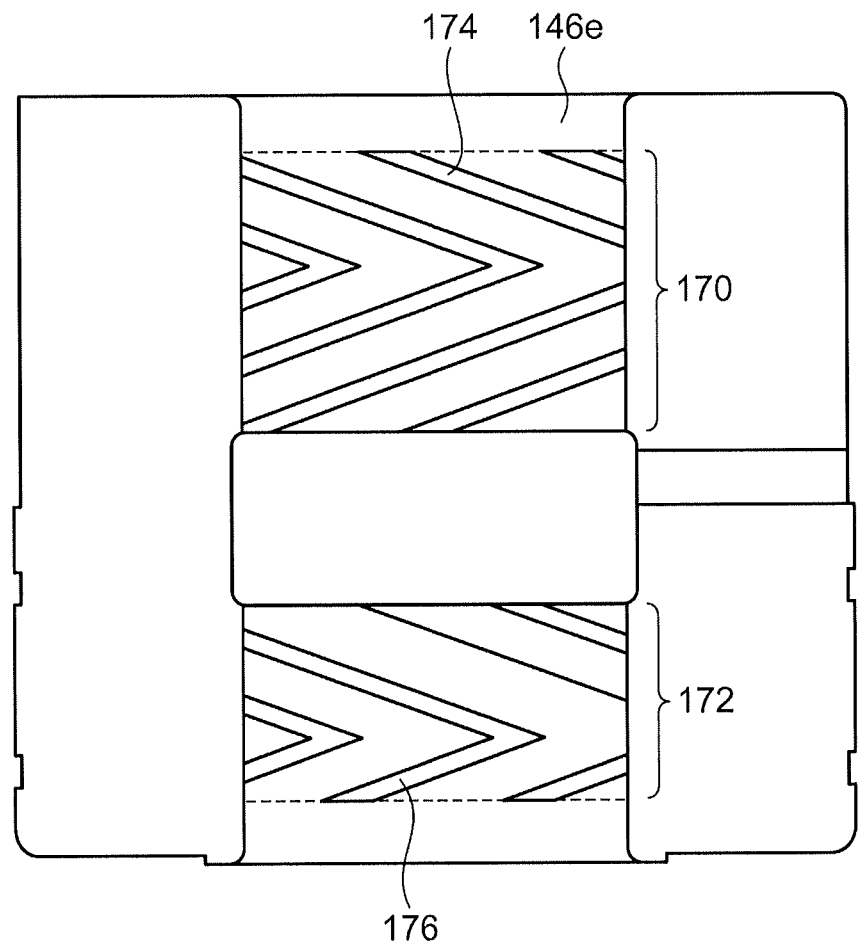
FIG. 5 is a section view of a sleeve of a rotating device according to a first modification example.

FIG. 5 is a section view of a sleeve 146 of a rotating device according to a first modification example. The section shown in FIG. 5 corresponds to the section shown in FIG. 2. The inner surface 146e of the sleeve 146 has an upper radial dynamic pressure groove forming region 170 and a lower radial dynamic pressure groove forming region 172, the two regions being spaced apart from each other in the axial direction. Asymmetric herringbone-shaped upper radial dynamic pressure grooves 174 are formed on the upper radial dynamic pressure groove forming region 170. Asymmetric herringbone-shaped lower radial dynamic pressure grooves 176 are formed on the lower radial dynamic pressure groove forming region 172.

Figure 6:
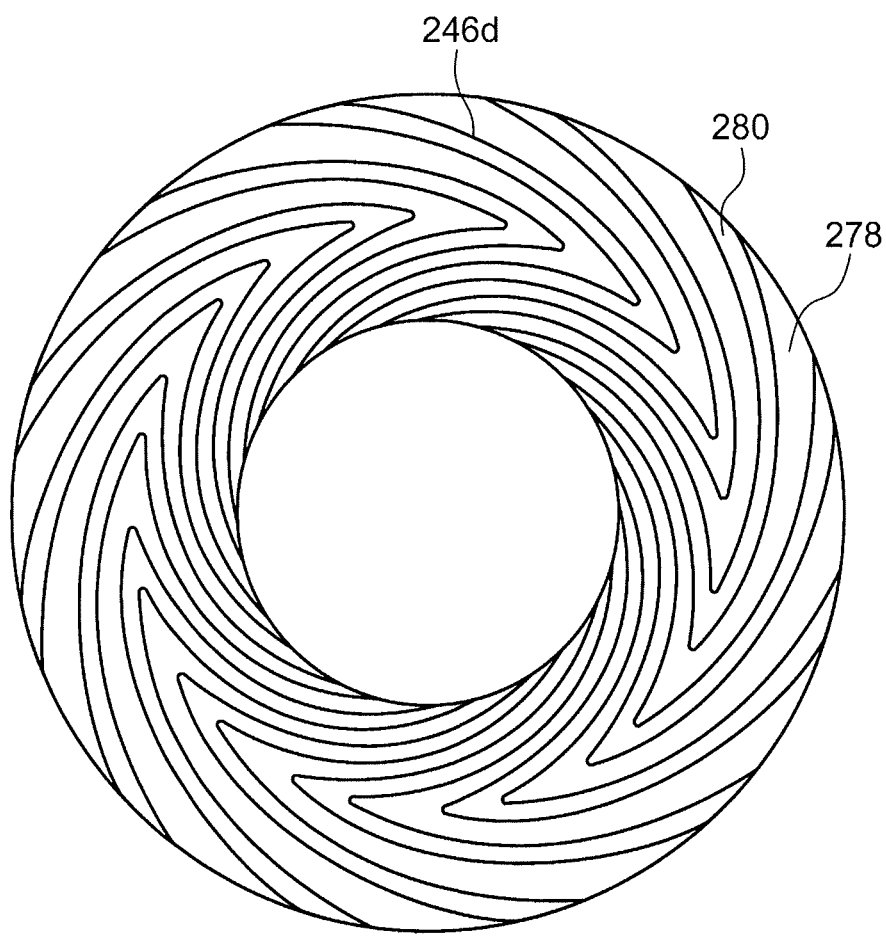
FIG. 6 is a section view of a sleeve of a rotating device according to a second modification example.

FIG. 6 is a section view of a sleeve 246 of a rotating device according to a second modification example. The upper-end surface 246d of the sleeve 246 has a thrust dynamic pressure groove forming region 278. Herringbone-shaped thrust dynamic pressure grooves 280 are formed on the thrust dynamic pressure groove forming region 278.

The Second Embodiment

The first embodiment describes the case where the housing 44 and the sleeve 46 are separately formed. The second embodiment describes the case where the housing and the sleeve are integrated into a single piece of a bearing unit 312.

Figure 7:
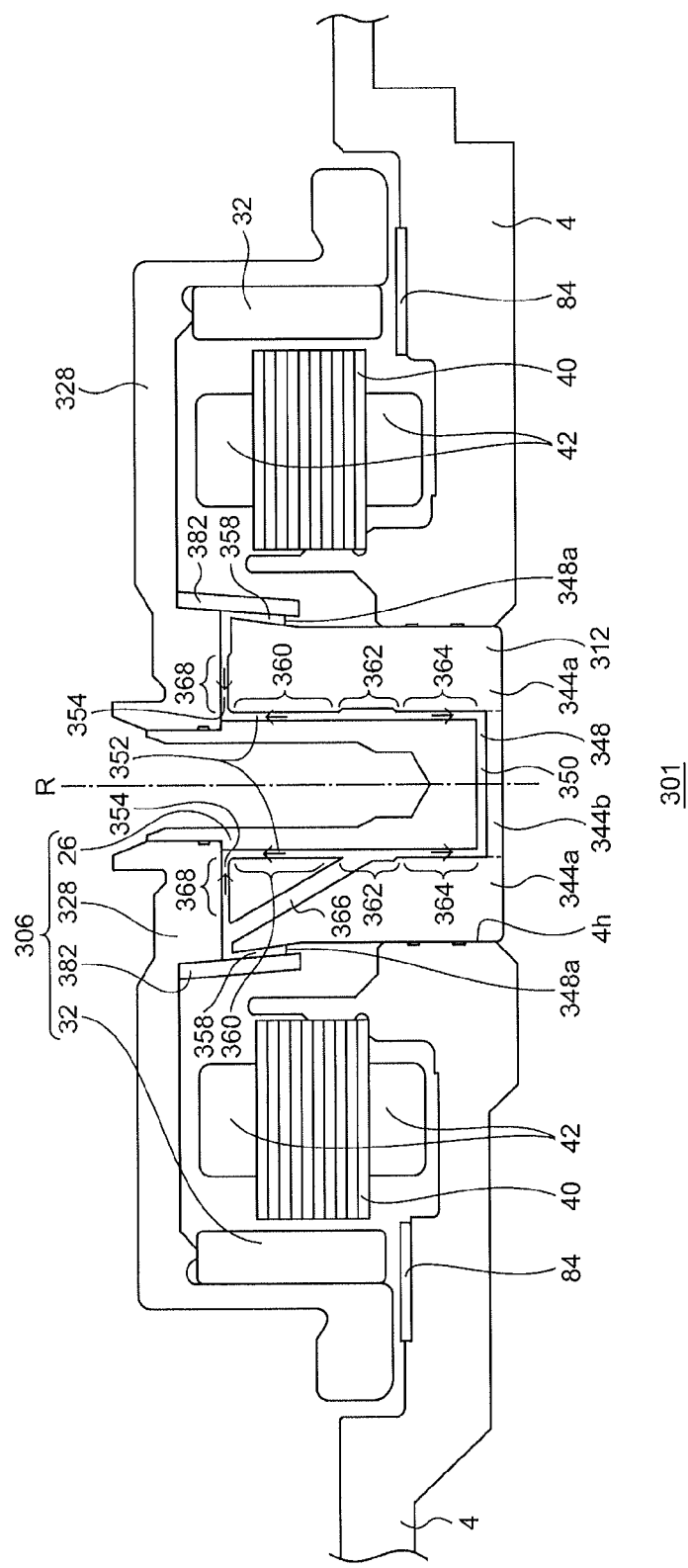
FIG. 7 is a section view of a rotating device according to a second embodiment.

FIG. 7 is a section view of a rotating device 301 according to the second embodiment. The rotating device 301 comprises a rotor 306 on which the magnetic recording disk 8 (not shown in FIG. 7) is to be mounted, the bearing unit 312, the base 4, the laminated core 40, the coils 42, and the magnetic ring 84. The rotor 306 includes the shaft 26, a hub 328, the cylindrical magnet 32, and a seal forming unit 382.

The bearing unit 312 is inserted into the through hole 4h of the base 4 and fixed therein. The bearing unit 312 rotatably supports the rotor 306 with respect to the base 4 via the lubricant 348. The bearing unit 312 is formed to be cup-shaped by integrating a cylindrical portion 344a and a bottom portion 344b as a single unit. The bearing unit 312 is glued onto the base 4 with the bottom portion 344b downside.

The cylindrical portion 344a surrounds the shaft 26, a cylindrical radial bearing gap 352 being interposed between the cylindrical portion 344a and the shaft 26. The upper end of the cylindrical portion 344a faces, in the axial direction, the hub 328, a ring-shaped upper gap 354 being interposed between the upper end and the hub 328. The bottom portion 344b faces, in the axial direction, the lower end of the shaft 26, a disk-shaped lower gap 350 being interposed between the bottom portion 344b and the lower end of the shaft 26. The upper-end surface of the cylindrical portion 344a has a thrust dynamic pressure groove forming region (not shown) arranged similar to the thrust dynamic pressure groove forming region 78 of the first embodiment.

The lubricant 348 is injected into the upper gap 354, the radial bearing gap 352 and the lower gap 350. A gas-liquid interface 348a of the lubricant 348 exists in an interface gap 358. The interface gap 358 is a gap between the inner surface of the seal forming unit 382 and the outer surface of the cylindrical portion 344a, the seal forming unit 382 surrounding the upper side of the bearing unit 312. In particular, the interface gap 358 forms a capillary seal, where the gap 358 gradually widens downward. The seal forming unit 382 is a ring-shaped unit separate from the hub 328 and is fixed (for example, glued) onto the lower surface of the hub 328. The seal forming unit 382 is formed so that the smallest inner diameter of the seal forming unit 382 is less than the largest outer diameter of the bearing unit 312. By doing so, the seal forming unit 382 functions as a retainer for the rotor 306.

The radial bearing gap 352 has: an upper radial dynamic pressure generation portion 360; a lower radial dynamic pressure generation portion 364 arranged below and spaced apart from the upper radial dynamic pressure generation portion 360; and an intermediate portion 362 arranged between the upper radial dynamic pressure generation portion 360 and the lower radial dynamic pressure generation portion 364 in the axial direction. When the rotor 306 rotates, a dynamic pressure for pushing the lubricant 348 upward is generated in the lubricant 348 existing in the upper radial dynamic pressure generation portion 360. When the rotor 306 rotates, a dynamic pressure for pushing the lubricant 348 downward is generated in the lubricant 348 existing in the lower radial dynamic pressure generation portion 364.

The upper gap 354 has a thrust dynamic pressure generation portion 368. When the rotor 306 rotates, a dynamic pressure for pushing the lubricant 348 inward is generated in the lubricant 348 existing in the thrust dynamic pressure generation portion 368.

A connection hole 366 linearly connecting the intermediate portion 362, and the outer side of the thrust dynamic pressure generation portion 368 is formed in the cylindrical portion 344a. The connection hole 366 is the shortest path, approximately, for connecting the intermediate portion 362 and the outer side of the thrust dynamic pressure generation portion 368. The connection hole 366 may be formed by drilling from the outer side of the upper-end surface of the cylindrical portion 344a towards a part of the inner surface of the cylindrical portion 344a that corresponds to the intermediate portion 362. In this case, compared with the bypass path in the first embodiment, the manufacturing process of the connection hole 366 becomes easier. In addition, since it is not necessary to provide a ring-shaped concave portion like the outer gap 56, the total amount of the lubricant 348 can be decreased accordingly.

Figure 8:
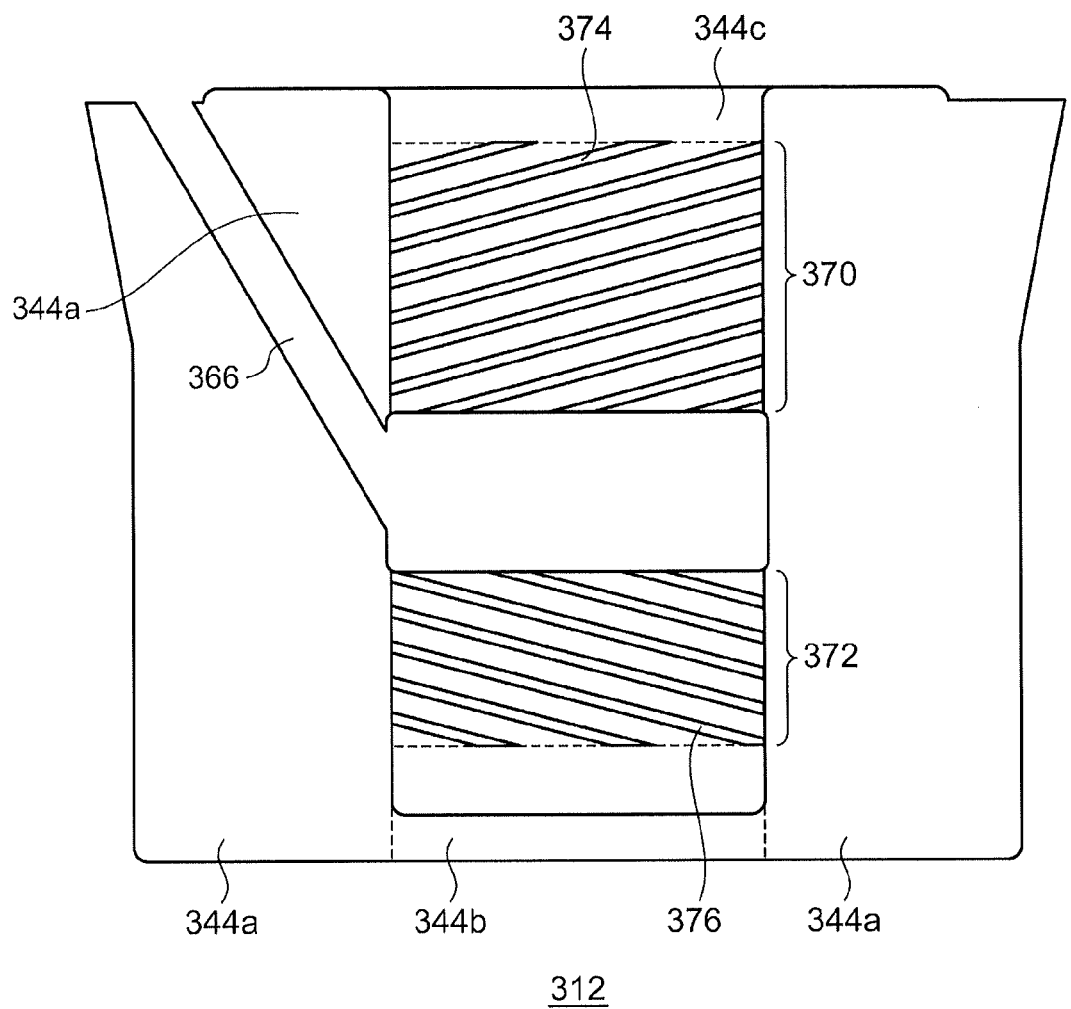
FIG. 8 is a section view of the bearing unit in FIG. 7.

FIG. 8 is a section view of the bearing unit 312 in FIG. 7. The section shown in FIG. 8 corresponds to the section shown in FIG. 7. The inner surface 344c of the cylindrical portion 344a has an upper radial dynamic pressure groove forming region 370 and a lower radial dynamic pressure groove forming region 372, the two regions being spaced apart from each other in the axial direction. Spiral-shaped upper radial dynamic pressure grooves 374 are formed on the upper radial dynamic pressure groove forming region 370. Spiral-shaped lower radial dynamic pressure grooves 376 are formed on the lower radial dynamic pressure groove forming region 372.

In the rotating device 301 according to the present embodiment, advantages can be realized that are similar to those realized by the rotating device 1 according to the first embodiment.

In addition, in the rotating device 301 according to the present embodiment, the seal forming unit 382 is mounted to the hub 328 instead of the hanging portion 28d in the first embodiment. By doing so, the amount of the part of the base material that is lost during the cut process manufacturing the hub can be reduced, thereby reducing the manufacturing cost of the hub.

FIG. 9 is a section view of a bearing unit 412 according to a third modification example. The bearing unit 412 is formed to be cup-shaped by integrating a cylindrical portion 444a and a bottom portion 344b as a single unit. A connection hole 466 linearly connecting the intermediate portion and the outer side of the thrust dynamic pressure generation portion is formed in the cylindrical portion 444a. The cylindrical portion 444a has an access port surface 444c on which an access port 466a is formed. The access port 466a is an upper port of the connection hole 466. The access port surface 444c is formed so that the surface 444c is approximately perpendicular to a direction E in which the connection hole 466 extends.

In this case, it is possible to orient a drill at a right angle, approximately, with respect to the access port surface 444c when the connection hole 466 is formed by drilling from the access port surface 444c. Therefore, the manufacturing process of the connection hole 466 becomes easier.

Above is an explanation for the structure and operation of the rotating device according to the embodiment. These embodiments are intended to be illustrative only, and it will be obvious to those skilled in the art that various modifications to constituting elements and processes could be developed and that such modifications are also within the scope of the present invention.

In each embodiment, the lower radial dynamic pressure generation portion is a radial dynamic pressure generation portion that is the closest to the lower gap. In that, there is no radial dynamic pressure generation portion between the lower radial dynamic pressure generation portion and the lower gap. An edge of each dynamic pressure generation portion may correspond to an edge of respective dynamic pressure grooves. Alternatively, a radial dynamic pressure generation portion may be defined between both sides, in the axial direction, of a radial dynamic pressure groove which exists continuously along the axial direction.

In each embodiment, other thrust dynamic pressure grooves may be formed on at least one of the lower-end surface of the shaft and a surface of the bearing unit that faces the lower-end surface.

In each embodiment, the thrust dynamic pressure grooves may not be provided. In the case where the thrust dynamic pressure grooves are not provided, since pressure in the lubricant existing in the lower gap increases when the rotor rotates, it is possible for the rotor to levitate.

Each embodiment describes the so-called outer-rotor type of the rotating device in which the cylindrical magnet is located outside the laminated core. However, the present invention is not limited to this. For example, the technical concept of the present embodiment can be applied to the so-called inner-rotor type of the rotating device in which the cylindrical magnet is located inside the laminated core.

Each embodiment describes the case where the bearing unit is directly mounted onto the base. However, the present invention is not limited to this. For example, a brushless motor comprising a rotor, a bearing unit, a laminated core, coils, and a base can be manufactured separately, and the manufactured brushless motor can be installed on a chassis.

Each embodiment describes the case where a laminated core is used. However, the present invention is not limited to this. The core does not have to be a laminated core.

What is claimed is:
1. A rotating device, comprising:
a hub on which a recording disk is to be mounted;
a shaft, with a first end affixed to the hub; and
a bearing unit arranged to rotatably support the shaft via a lubricant,
wherein the bearing unit includes:
a surrounding portion arranged to surround the shaft; and
a facing portion arranged to face a second end of the shaft,
wherein a gap between the shaft and the surrounding portion includes:

a first dynamic pressure generation portion in which a first dynamic pressure is generated when the shaft rotates in a predetermined direction, the first dynamic pressure pushing the lubricant along a first path towards the first end of the shaft;

a second dynamic pressure generation portion in which a second dynamic pressure is generated when the shaft rotates in the predetermined direction, the second dynamic pressure pushing the lubricant towards the second end of the shaft, and the second dynamic pressure generation portion being arranged axially between the second end of the shaft and the first dynamic pressure generation portion, and the second dynamic pressure generation portion being arranged separate from the first dynamic pressure generation portion; and an intermediate portion arranged between the first dynamic pressure generation portion and the second dynamic pressure generation portion, wherein, in the case where a side of the first dynamic pressure generation portion closer to the first end of the shaft is called a first side, the bearing unit further includes a second path of the lubricant arranged to connect the first side of the first dynamic pressure generation portion and the intermediate portion, wherein the second path does not overlap with the first path and wherein one opening of the second path is provided in the intermediate portion, and wherein the shaft and the bearing unit are arranged so that a gap between the second end of the shaft and the facing portion communicates only with the second dynamic pressure generation portion.

2. The rotating device according to claim 1, wherein a gap between the surrounding portion and the hub has a third dynamic pressure generation portion in which a third dynamic pressure is generated when the shaft rotates in the predetermined direction, the third dynamic pressure pushing the lubricant towards the shaft, and wherein, in the case where there are two sides of the third dynamic pressure generation portion and in the case where a first side is farther than a second side when measured from the shaft, the second path of the lubricant connects the intermediate portion and the first side of the third dynamic pressure generation portion.

3. The rotating device according to claim 2, wherein spiral-shaped dynamic pressure grooves are formed on at least one of a surface of the surrounding portion and a surface of the hub, the surface of the surrounding portion and the surface of the hub facing each other with the third dynamic pressure generation portion being interposed between the surface of the surrounding portion and the surface of the hub.

4. The rotating device according to claim 1, wherein spiral-shaped upper radial dynamic pressure grooves are formed on at least one of a part of an outer surface of the shaft and a part of an inner surface of the surrounding portion, the part of the outer surface of the shaft and the part of the inner surface of the surrounding portion facing each other with the first dynamic pressure generation portion being interposed between the part of the outer surface of the shaft and the part of the inner surface of the surrounding portion, and wherein spiral-shaped lower radial dynamic pressure grooves are formed on at least one of an other part of the outer surface of the shaft and an other part of the inner surface of the surrounding portion, the other part of the outer surface of the shaft and the other part of the inner surface of the surrounding portion facing each other with the second dynamic pressure generation portion being interposed between the other part of the outer surface of the shaft and the other part of the inner surface of the surrounding portion.

5. The rotating device according to claim 1, wherein the bearing unit further includes an other surrounding portion arranged to surround the surrounding portion and formed as a portion separate from the surrounding portion, wherein the surrounding portion and the other surrounding portion form a ring-shaped concave portion extending towards the second end of the shaft from an end surface of the surrounding portion, and wherein a connection hole connecting the intermediate portion and the concave portion is arranged in the surrounding portion, and wherein the second path of the lubricant includes the concave portion and the connection hole.

6. The rotating device according to claim 5, wherein the facing portion and the other surrounding portion are integrated into one member, and wherein the member is in a cup shape with a bottom.

7. The rotating device according to claim 6, wherein the other surrounding portion is formed so that the maximum radial thickness of a part of the other surrounding portion that is glued onto the outer surface of the surrounding portion is in the range of one-third to one-fifteenth of the maximum radial thickness of a part of the surrounding portion that is glued onto the inner surface of the other surrounding portion.

8. The rotating device according to claim 1, wherein the second path of the lubricant is formed in a linear manner.

9. The rotating device according to claim 8, wherein the surrounding portion includes an access surface on which an access port of the second path of the lubricant is formed, and wherein the access surface is formed so that the access surface is substantially perpendicular to a direction in which the second path of the lubricant extends.

10. The rotating device according to claim 1, further comprising a seal forming portion mounted to the hub, the seal forming portion being formed as a portion separate from the hub, wherein the seal forming portion surrounds the bearing unit, and wherein a gas-liquid interface of the lubricant is formed in a gap between the bearing unit and the seal forming portion.

11. A rotating device, comprising:

a shaft;

a shaft fixing portion arranged to fix a first end of the shaft; and a bearing unit arranged to support the shaft via a lubricant, allowing relative rotation of the shaft, wherein the bearing unit includes:

a surrounding portion arranged to surround the shaft; and a facing portion arranged to face a second end of the shaft, wherein a gap between the shaft and the surrounding portion includes:

a first dynamic pressure generation portion in which a first dynamic pressure is generated when the shaft rotates in a predetermined direction, the first dynamic pressure pushing the lubricant along a first path towards the first end of the shaft;

a second dynamic pressure generation portion in which a second dynamic pressure is generated when the shaft rotates in the predetermined direction, the second dynamic pressure pushing the lubricant towards the second end of the shaft, and the second dynamic pressure generation portion being arranged axially between the second end of the shaft and the first dynamic pressure generation portion, and the second dynamic pressure generation portion being arranged separate from the first dynamic pressure generation portion; and an intermediate portion arranged between the first dynamic pressure generation portion and the second dynamic pressure generation portion, wherein, in the case where a side of the first dynamic pressure generation portion closer to the first end of the shaft is called a first side, the bearing unit further includes a second path of the lubricant arranged to connect the first side of the first dynamic pressure generation portion and the intermediate portion, wherein the second path does not overlap with the first path and wherein one opening of the second path is provided in the intermediate portion, and wherein the shaft and the bearing unit are arranged so that a gap between the second end of the shaft and the facing portion communicates only with the second dynamic pressure generation portion.

12. The rotating device according to claim 11, wherein a gap between the surrounding portion and the shaft fixing portion has a third dynamic pressure generation portion in which a third dynamic pressure is generated when the shaft rotates in the predetermined direction, the third dynamic pressure pushing the lubricant towards the shaft, and wherein, in the case where there are two sides of the third dynamic pressure generation portion and in the case where one side is farther than the other side when measured from the shaft, the second path of the lubricant connects the intermediate portion and the one side of the third dynamic pressure generation portion.

13. The rotating device according to claim 12, wherein spiral-shaped dynamic pressure grooves are formed on at least one of a surface of the surrounding portion and a surface of the shaft fixing portion, the surface of the surrounding portion and the surface of the shaft fixing portion facing each other with the third dynamic pressure generation portion being interposed between the surface of the surrounding portion and the surface of the shaft fixing portion.

14. The rotating device according to claim 11, wherein spiral-shaped upper radial dynamic pressure grooves are formed on at least one of a part of an outer surface of the shaft and a part of an inner surface of the surrounding portion, the part of the outer surface of the shaft and the part of the inner surface of the surrounding portion facing each other with the first dynamic pressure generation portion being interposed between the part of the outer surface of the shaft and the part of the inner surface of the surrounding portion, and wherein spiral-shaped lower radial dynamic pressure grooves are formed on at least one of an other part of the outer surface of the shaft and an other part of the inner surface of the surrounding portion, the other part of the outer surface of the shaft and the other part of the inner surface of the surrounding portion facing each other with the second dynamic pressure generation portion being interposed between the other part of the outer surface of the shaft and the other part of the inner surface of the surrounding portion.

15. The rotating device according to claim 11, wherein the bearing unit further includes an other surrounding portion arranged to surround the surrounding portion and formed as a portion separate from the surrounding portion, and wherein the surrounding portion and the other surrounding portion form a ring-shaped concave portion extending towards the second end of the shaft from an end surface of the surrounding portion, and wherein a connection hole connecting the intermediate portion and the concave portion is arranged in the surrounding portion, and wherein the second path of the lubricant includes the concave portion and the connection hole.

16. The rotating device according to claim 15, wherein the facing portion and the other surrounding portion are integrated into one member, and wherein the member is in a cup shape with a bottom.

17. The rotating device according to claim 16, wherein the other surrounding portion is formed so that the maximum radial thickness of a part of the other surrounding portion that is glued onto the outer surface of the surrounding portion is in the range of one-third to one-fifteenth of the maximum radial thickness of a part of the surrounding portion that is glued onto the inner surface of the other surrounding portion.

18. The rotating device according to claim 11, wherein the second path of the lubricant is formed in a linear manner.

19. The rotating device according to claim 18, wherein the surrounding portion includes an access surface on which an access port of the second path of the lubricant is formed, and wherein the access surface is formed so that the access surface is substantially perpendicular to a direction in which the second path of the lubricant extends.

20. The rotating device according to claim 11, further comprising a seal forming portion fixedly arranged on the shaft fixing portion, wherein the seal forming portion surrounds the bearing unit, and wherein a gas-liquid interface of the lubricant is formed in a gap between the bearing unit and the seal forming portion.

* * * * *